US007257307B2

(12) United States Patent
Kim et al.

(10) Patent No.: US 7,257,307 B2
(45) Date of Patent: Aug. 14, 2007

(54) MEMS SWITCH

(75) Inventors: Che-heung Kim, Yongin-si (KR); Hyung Choi, Seongnam-si (KR); In-sang Song, Seoul (KR); Sang-hun Lee, Seoul (KR); Sang-wook Kwon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/471,511

(22) Filed: Jun. 21, 2006

(65) Prior Publication Data

US 2007/0122074 A1 May 31, 2007

(30) Foreign Application Priority Data

Nov. 30, 2005 (KR) ...................... 10-2005-0115958

(51) Int. Cl.
*G02B 6/00* (2006.01)

(52) U.S. Cl. ........................... 385/147; 385/15; 385/16

(58) Field of Classification Search .................. 385/15, 385/16, 147
See application file for complete search history.

(56) References Cited

U.S. PATENT DOCUMENTS

| | | | | |
|---|---|---|---|---|
| 6,657,525 | B1 | 12/2003 | Dickens et al. | |
| 2005/0236935 | A1 * | 10/2005 | Ohmori et al. | 310/328 |
| 2006/0144681 | A1 * | 7/2006 | Lee et al. | 200/181 |

OTHER PUBLICATIONS

Korean Office Action dated Nov. 17, 2006 issued in corresponding KR Patent Application No. 2005-115958.

* cited by examiner

*Primary Examiner*—Jennifer Doan
(74) *Attorney, Agent, or Firm*—Sughrue Mion, PLLC

(57) ABSTRACT

A MEMS (micro electro mechanical system) switch, which includes a substrate; a fixed electrode formed on an upper side of the substrate; a signal line formed on both sides of the fixed electrode; a contact member formed on an upper side of the signal line at a distance from said fixed electrode and contacting an edging portion of the signal line; a supporting member supporting the contact member to be movable; and a moving electrode disposed on an upper side of the supporting member.

25 Claims, 8 Drawing Sheets

MEMS SWITCH

CROSS-REFERENCE TO RELATED APPLICATIONS

This application claims priority under 35 U.S.C. § 119(a) from Korean Patent Application No. 2005-115958, filed Nov. 30, 2005, in the Korean Intellectual Property Office, the entire contents of which are incorporated herein by reference.

BACKGROUND OF THE INVENTION

1. Field of the Invention

The present invention relates to a MEMS (micro electro mechanical system) and a method for manufacturing thereof.

2. Description of the Related Art

Many electronic systems used in high frequency band are super-small, super-lightweight and high-powered. Accordingly, widely studied is a super-small micro-switch using a new technology named micro-machining to replace semiconductor switches such as FET (field effect transistor) or PIN diode used to control a signal in these systems.

The most manufactured RF (radio frequency) element using MEMS (micro-electro mechanical system) is a switch. The RF switch is often applied in an impedance matching circuit or a signal selection transmission at a wireless communication terminal or system in a microwave or millimeter wave band.

When DC (direct current) voltage is supplied to the fixing electrode, the conventional MEMS switch is charged between a fixing electrode and a moving electrode. The moving electrode is pulled towards a substrate by electrostatic force. After that, a contract member formed on the moving electrode is in contact with a signal line formed on the substrate, and switch is on or off.

An example on the above-mentioned MEMS switch is disclosed in U.S. Pat. No. 6,100,477.

FIG. 1 is a view of the structure of a MEMS (micro-electro mechanical system) switch in a prior art, showing the MEMS switch disclosed in the U.S. Pat. No. 6,100,477 in the off state. FIG. 2 shows the MEMS switch of FIG. 1 in the on state.

Referring to FIGS. 1 and 2, the MEMS switch in the prior art includes: a substrate 28 formed with a cavity 30; a fixing electrode 38 formed on at least one part of the cavity 30; a membrane 38 formed at an interval with the fixing electrode 38 and transformed towards the fixing electrode 34 as a voltage is supplied to the fixing electrode 38; and insulating layers 32, 40. The membrane 34 is provided with a bending structure 36 therearound to flexibly support the membrane 34.

The MEMS also includes a RF (radio frequency) inputting end 44, a DC (direct current) bias 42, a fixing capacitance 46 and a RF outputting end 48.

FIG. 3 is a view of a structure of another MEMS switch in the prior art, showing a structure of the MEMS switch disclosed in the U.S. patent application Publication No. US2003/0227361. FIG. 4 is a view taken along a line IV-IV of FIG. 3 showing a switch-off state, and FIG. 5 is a view taken along a line IV-IV of FIG. 3 showing a switch-on state.

Referring to FIGS. 3 through 5, a MEMS (micro electro mechanical system) switch 40 includes RF (radio frequency) conductors 42, 43 which are disposed on a substrate 44.

An upper part of the substrate 44 is provided with a bridge structure 46 having a central rigid body 48. The central rigid body 48 is vertically movable by spring arms 50 connected with supporting members 52.

The central rigid body 48 is formed with segments 54, 55, 56 on a center and edge parts. The bridge structure 46 is formed with the spring arms 50 which is, at one part, extended along the underside of the central rigid body 48. The spring arms 50 form electrode portions 60, 61, respectively. The segment 56 is provided with a contact member 64 electrically connecting the RF conductors 42, 43, when the switch 40 operates.

The electrode portions 60, 61 are supported by the supporting members 52.

The substrate 44 is formed with electrodes 70, 71 corresponding to the electrode portions 60, 61. Both sides of the electrodes 70, 71 are provided with stoppers 74, 75 restricting a descending operation of the central rigid body 48.

However, the abovementioned switches in the prior art are formed with the membrane in contact with the entire surface of the contact member 64, easily causing a sticking failure and accordingly lowering reliability.

The switching operation occurs in the central part of the membrane 34 in FIGS. 1 and 2 or the central part of the central rigid body 48 in FIGS. 3-5, which have relatively less restoring force than other portions therearound, easily causing the sticking failure.

When the membrane 34 or the central rigid body 48 is moved downward, the abovementioned MEMS switch decreases the restoring force and accordingly causing aggravated stability due to the sticking failure.

SUMMARY OF THE INVENTION

An aspect of the present intention is to address the above problems of the related art and to provide a MEMS (micro-electro mechanical system) switch achieving switch stability by decreasing sticking failures.

Another aspect of the present invention is to provide a MEMS switch driven at low voltage.

Yet another aspect of the present invention is to provide a MEMS switch with increased contact force by improving contact structures.

In order to achieve the above-described aspects of the present invention, there is provided a MEMS switch comprising: a substrate; a fixed electrode formed on an upper side of the substrate; at least one signal line formed on both sides of the fixed electrode; a contact member formed on an upper side of the signal line at a distance from said fixed electrode and contacting an edging portion of the signal line; a supporting member supporting the movable contact member; and a moving electrode disposed on an upper side of the supporting member.

Both ends of the contact member overlap with one end of the signal line.

The upper side of the signal line is formed in a higher position than an upper side of the fixed electrode.

The supporting member includes an anchoring portion of which both ends are contacted and supported on the signal line and a spring arm which maintains the contact member from the signal line at the distance from the fixed electrode and flexibly supports the contact member.

The supporting member is formed of insulating materials. The insulating materials are formed of one of SiNx (silicon nitride film), $SiO_2$ (silicon oxide film) and polymer.

The moving electrode is combined with an auxiliary electrode in an orthogonal direction of a lengthwise direction of the contacting member, and the supporting member is combined with an auxiliary supporting portion supporting the auxiliary electrode.

The fixed electrode and the auxiliary electrode are formed of aluminum (Al) or gold (Au), and the signal line is formed of Au.

BRIEF DESCRIPTION OF THE DRAWING FIGURES

The above and other aspects of the present invention will become more apparent by describing in detail exemplary embodiments thereof with reference to the attached drawing figures, wherein;

FIG. 1 is a view of a structure of a MEMS (micro-electro mechanical system) switch in a prior art, showing a MEMS switch disclosed in the U.S. Pat. No. 6,100,477 in the off state;

DETAILED DESCRIPTION OF THE EXEMPLARY EMBODIMENTS

Figure 1:
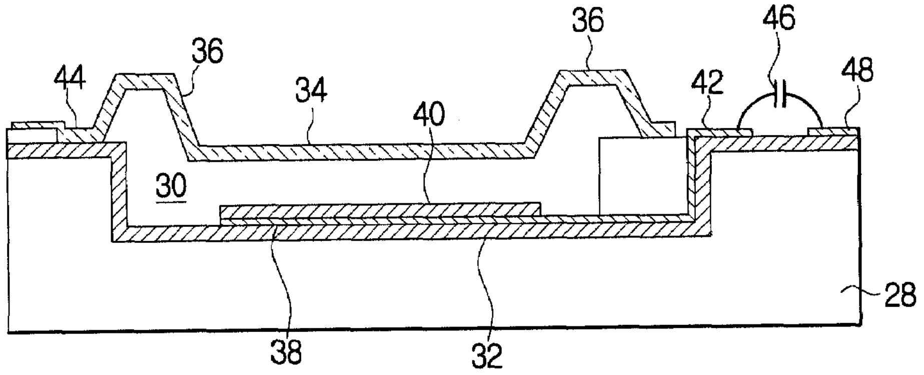
FIG. 1 (PRIOR ART)
Figure 2:
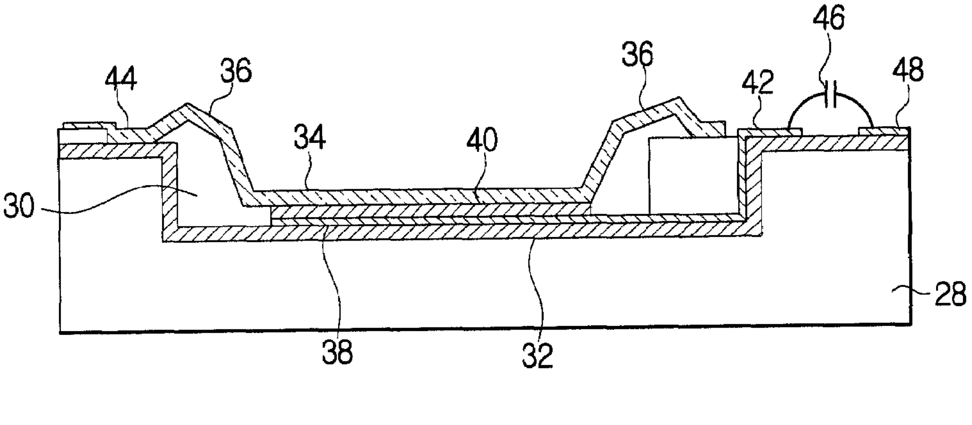
FIG. 2 (PRIOR ART)
FIG. 2 shows the MEMS switch of FIG. 1 in the on state.
Figure 3:
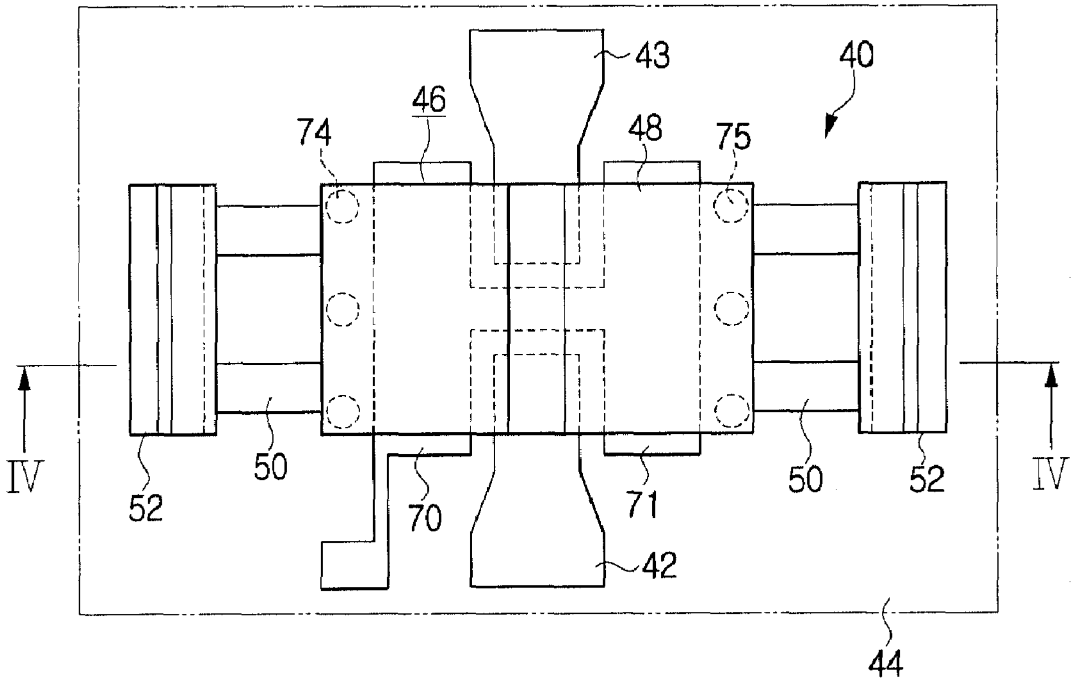
FIG. 3 (PRIOR ART)
FIG. 3 is a view of a structure of another MEMS switch in the prior art, showing a structure of the MEMS switch disclosed in the U.S. patent application Publication No. US2003/0227361.
Figure 4:
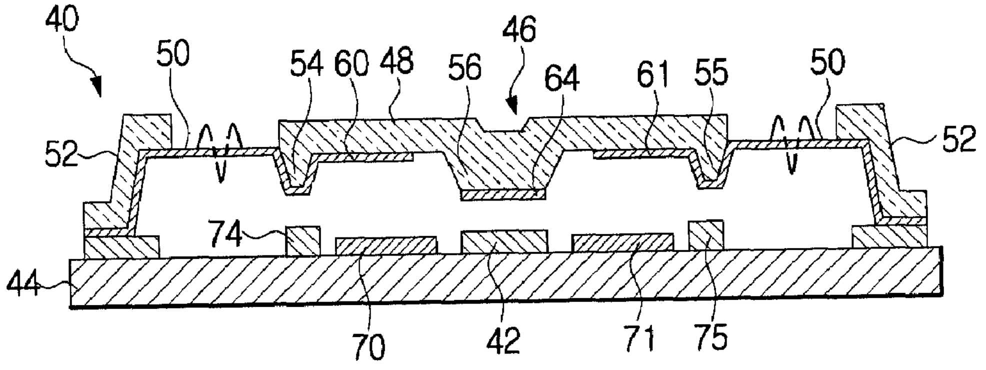
FIG. 4 (PRIOR ART)
FIG. 4 is a view taken along a line IV-IV of FIG. 3, showing a switch in the off state.
Figure 5:
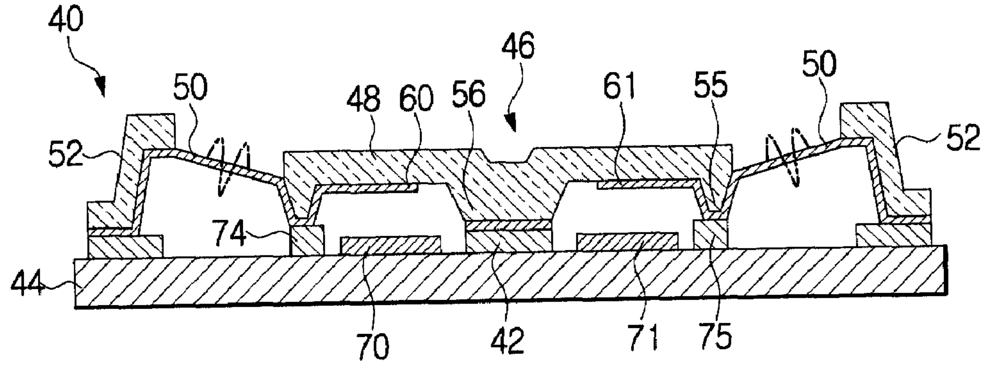
FIG. 5 (PRIOR ART)
FIG. 5 is a view taken along a line IV-IV of FIG. 3, showing a switch in the on state.

Hereinafter, an exemplary embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 6:
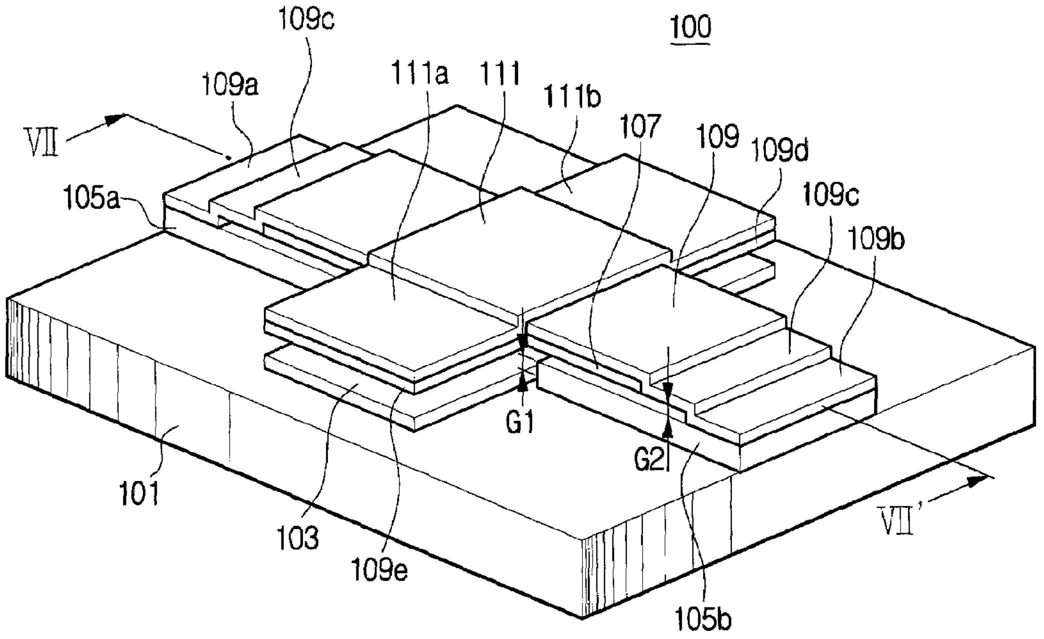
FIG. 6 is a perspective view of a MEMS switch structure, showing a switch in the off state, according to an exemplary embodiment of the present invention.
Figure 7:
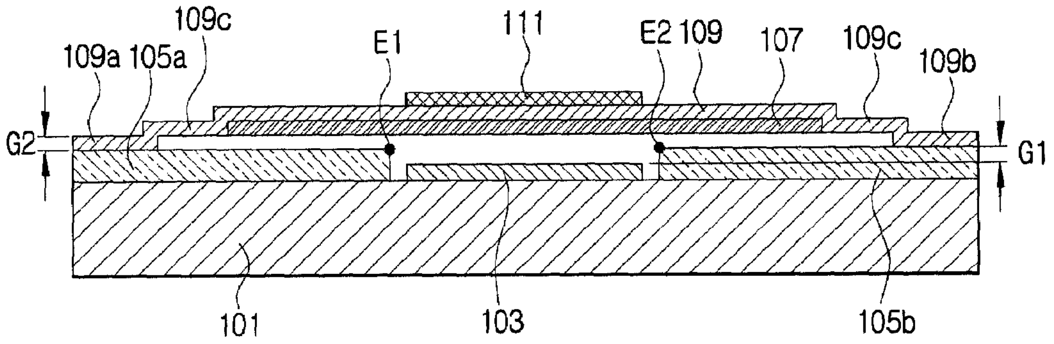
FIG. 7 is a view taken along a line VII-VII of FIG. 6.

FIG. 6 is a perspective view of a MEMS (micro electro mechanical system) switch structures, showing a switch in the off state, according to an exemplary embodiment of the present invention, and FIG. 7 is a view taken along a line VII-VII of FIG. 6.

Referring to FIGS. 6 and 7, the MEMS switch 100 includes a fixed electrode 103 and signal lines 105*a*, 105*b* which are disposed on an upper side of a substrate 101. The fixed electrode 103 is formed on a central part of the substrate 101 and the signal line 105*a*, 105*b* are disposed between the substrate and the supporting member 109. The signal lines 105*a*, 105*b* are deposed thicker than the fixed electrode 103 so as to form a gap G1 between the upper sides of the signal lines 105*a*, 105*b* and an upper surface of the fixed electrode 103. The fixed electrode 103 may be made of conductive materials such as Al (aluminum) or Au (gold), and the signal lines 105*a*, 105*b* may be formed of conductive materials such as Au (gold).

A contact member 107 is formed on an upper side of the fixed electrode 103, and ends above of each of the signal lines 105*a*, 105*b* adjacent to the fixed electrode 103. The contact member 107 is disposed at a gap G2 from the upper sides of the signal lines 105*a*, 105*b* through a supporting member 109.

The supporting member 109 includes anchoring portions 109*a*, 109*b* of which both ends are in contact with the upper sides of the signal lines 105*a*, 105*b* to support thereof, and a spring arm 109*c* maintaining the contact member 107 with the signal lines 105*a*, 105*b* at the gap G2 and flexibly supporting the contact member 107. The supporting member 109 may be an insulating material such as SiNx (silicon nitride film), $SiO_2$ (silicon oxide film) and polymer. The supporting member 109 serves as an anchor supporting the contact member 107 and insulates a moving electrode 111 and the fixed electrode 103, which will be described later. The above structure may solve problems of complicated structures and increased processes by separating the anchor and the an insulating layer.

An upper side of the supporting member 109 is deposed with the moving electrode 111. The moving electrode may be formed with additional auxiliary electrodes 111*a*, 111*b* (refer to FIG. 6) in an orthogonal direction with respect to a lengthwise direction of the contact member 107, in order to decrease driving voltage.

The supporting member 109 may be formed additional auxiliary supporting portions 109*d*, 109*e* supporting the auxiliary electrodes 111*a*, 111*b*. Just as the fixed electrode 103 may, so may the moving electrode 111 be formed of Al or Au.

An operation of the above-structured MEMS operation of the present invention will be briefly mentioned.

Figure 8:
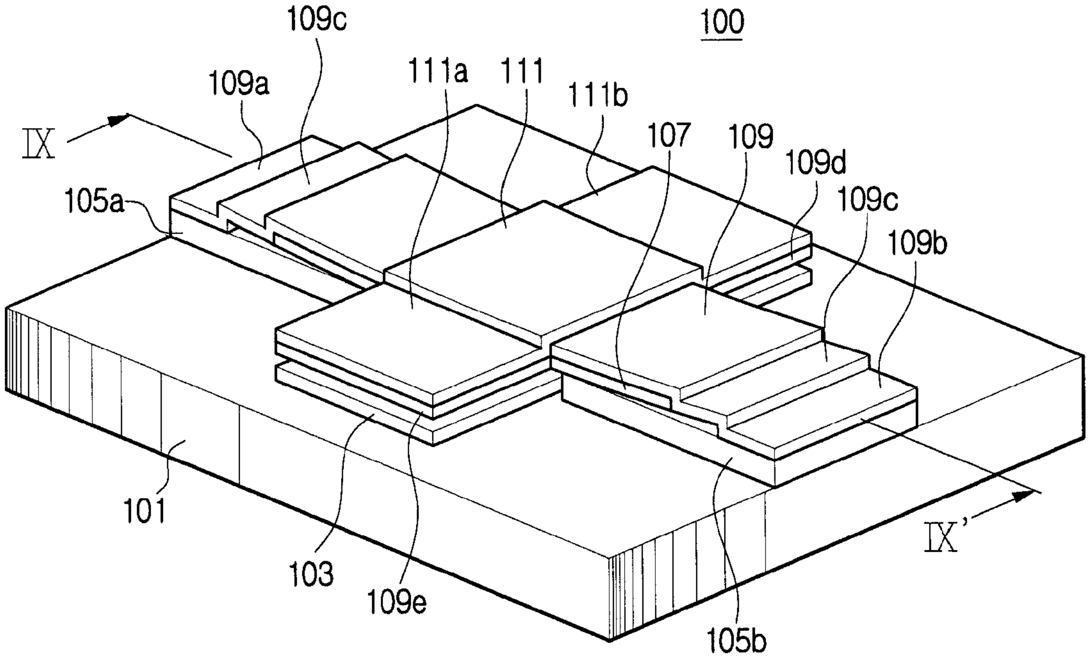
FIG. 8 is a perspective view of the MEMS switch structure, showing a switch in the on state, according to an exemplary embodiment of the present invention.
Figure 9:
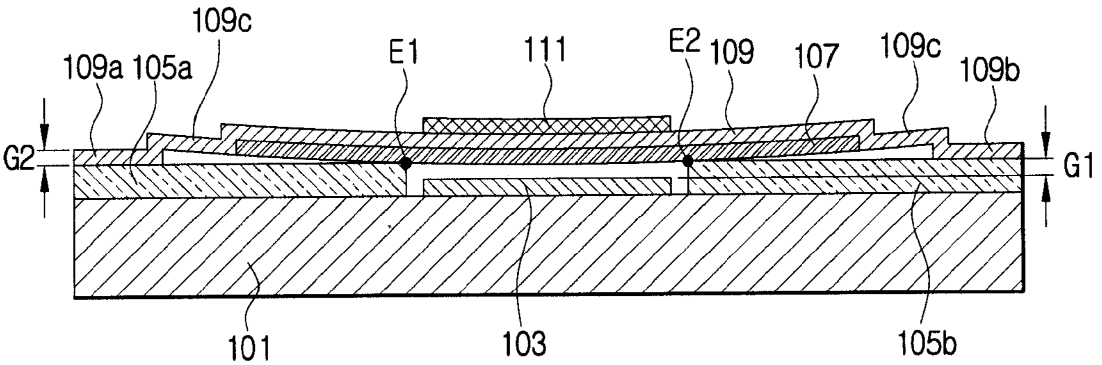
FIG. 9 is a view taken along a line IX-IX of FIG. 8.

FIG. 8 is a perspective view of the MEMS switch structure, showing a switch in the on state, according to an exemplary embodiment of the present invention, and FIG. 9 is a view taken along a line IX-IX of FIG. 8.

Referring to FIGS. 8 and 9, if a voltage is supplied to the fixed electrode 103, the gap between the fixed electrode 103 and the moving electrode 111 is charged, and the moving electrode 111 descends towards the fixed electrode 130 by electrostatic attraction.

In accordance with a descending operation of the moving electrode 111, the supporting member 109 and the contact member 107 move down together, to contact edge portions E1, E2 of the signal lines 105*a*, 105*b* and connect the signal lines 105*a*, 105*b*. Likewise, as the contact member 107 comes in contact with the edging portions E1, E2 of the signal lines 105*a*, 105*b*, the contact force is greater than the conventional invention, while the contact area is relatively less than the conventional invention, so that the possibility of sticking failure decreases.

As contact occurs away of a central part of the moving electrode 111, that is, adjacent to the anchoring portions 109*a*, 109*b*, the restoring force strengthens. That is, as a moment arm becomes less than the conventional invention, of which sticking force is exerted from a center of the moving electrode 111, the sticking moment decreases, resulting in declining sticking failure.

The contact member 107 contacts the sharp edging portions E1, E2 of the signal lines 105*a*, 105*b*, and minimizes the influence of remains (for example, remains of a sacrificing layer 106 if it is not completely removed; the remains will be described later). Accordingly, contact resistance may be decrease.

In the abovementioned structure, the edging portions E1, E2 of the signal lines 105*a*, 105*b* may be formed with an orthogonal section of the signal lines 105*a*, 105*b* as one example, but various changes in forms for improving the contact may be made therein without departing from the spirit and scope of the invention as defined by the appended claims.

Hereinbelow, the manufacturing process of the abovementioned MEMS switch 100 will be described more in detail.

FIGS. 10A through 10F are a flowchart of a manufacturing process of the MEMS switch of the present invention.

Referring to 10A, the fixed electrode 103 is formed on the substrate 101, to create the signal lines 105*a*, 105*b*. The fixed electrode 103 and the signal lines 105*a*, 105*b* may be formed of conductive materials. The fixed electrode 103 may be formed of metals such as Al or Au, and the signal lines 105*a*, 105*b* may be formed of conductive materials such as Au. Generally, the fixed electrode 103 and the signal lines 105*a*, 105*b* may be deposed by sputtering or evaporation.

The substrate 101 may be a silicon substrate.

The signal lines 105*a*, 105*b* may be thicker than the fixed electrode 103, to form a gap G1 between upper surfaces of the signal lines 105*a*, 105*b* and an upper surface of the fixed electrode 103.

Figure 10A:
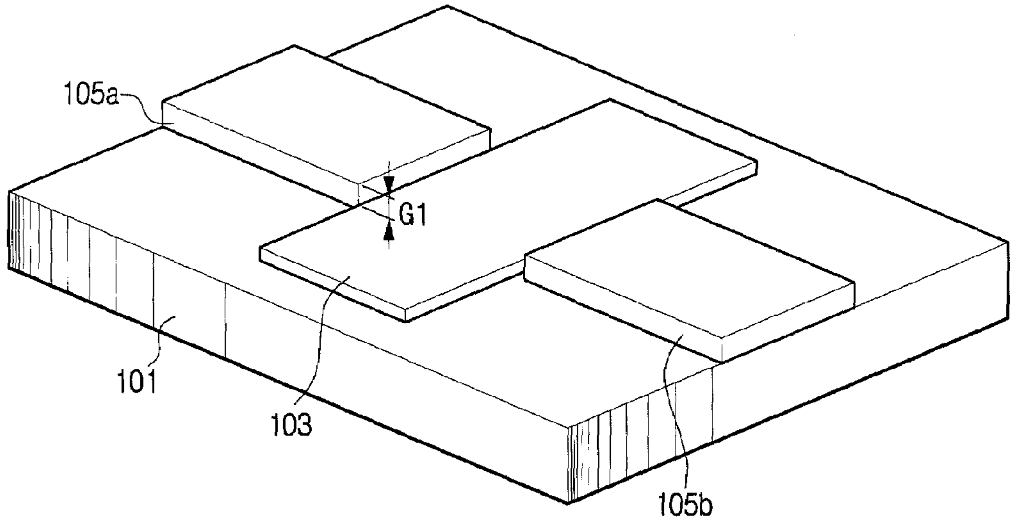
FIGS. 10A through 10F are a flowchart of a manufacturing process of the MEMS switch of an exemplary embodiment of the present invention.
Figure 10B:
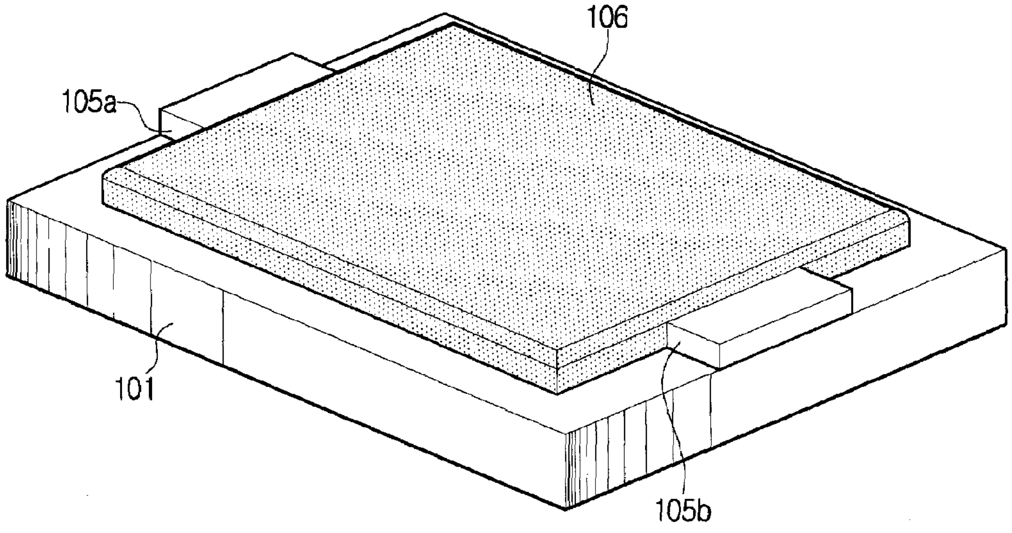

Referring to FIG. 10B, one parts of the fixed electrode 103 and the signal lines 105*a*, 105*b* are deposed with the sacrificing layer 106. The sacrificing layer may be used with a photoresist, and the photoresist may be applied with a spin coater. The sacrificing layer 106 deposed as abovementioned goes through a curing process. The cutting process is to preheat the sacrificing layer 106 at a high temperature, in order to prevent problems such as loss of components of the sacrificing layer 106 in a forming process of the moving electrode 111, the supporting member 109 and the contact member 107 at a high temperature, which will be described later.

Figure 10C:
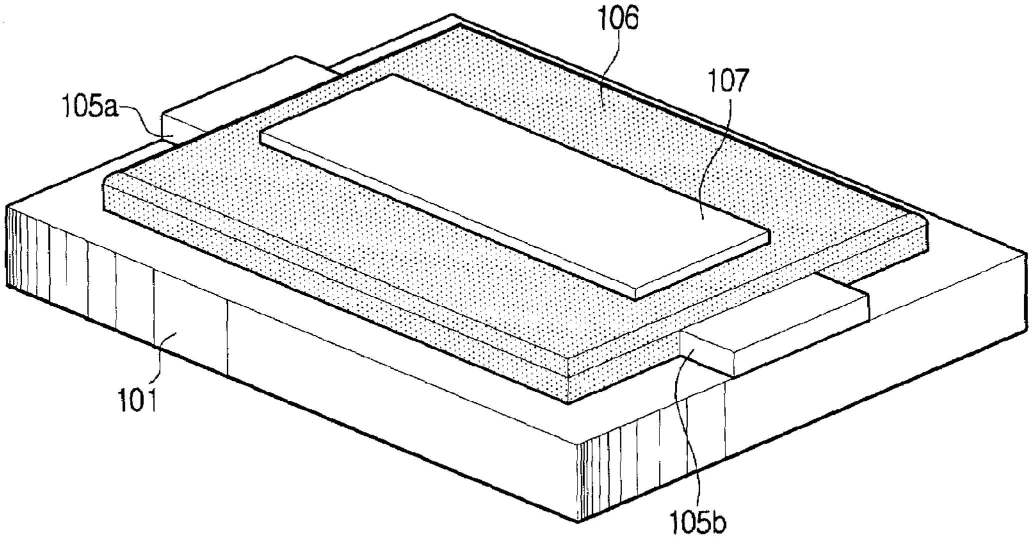

Referring to FIG. 10C, an upper side of the sacrificing layer 106 is formed with the contact member 107. The contact member 107 may be formed of conductive materials such as Au, Ir (iridium), and Pt (platinum). The deposition may be achieved by sputtering or evaporation. The contact member 107 may be formed to pass through the central part of the fixed electrode 103 so that a part of the contact member 107 may be long enough to overlap with a part of the signal lines 105*a*, 105*b*.

Figure 10D:
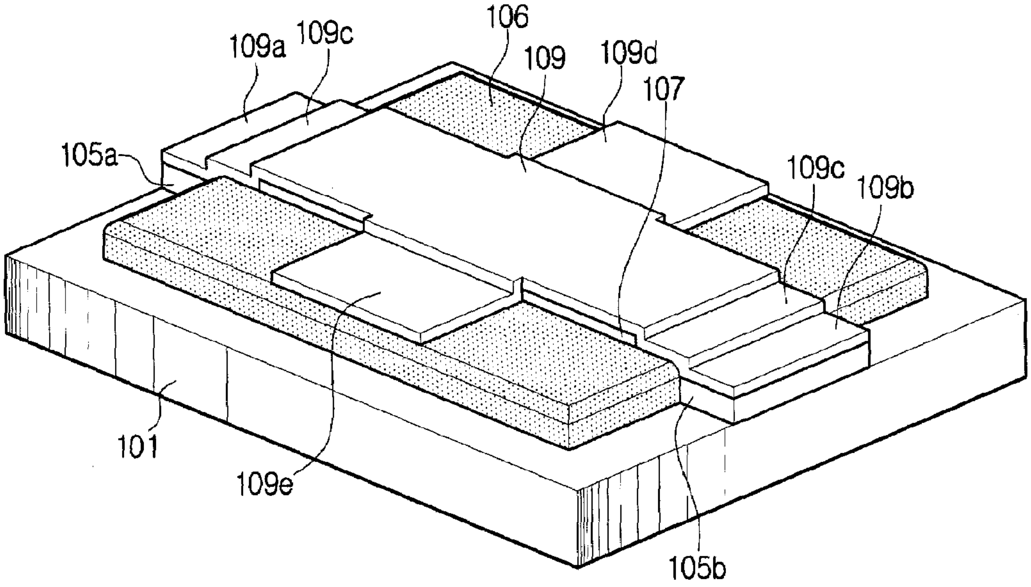

FIG. 10D, the supporting member 109 may be formed on an upper side of the contact member 107. Both ends of the supporting member 109 contact the signal lines 105*a*, 105*b*, to form the anchoring portions 109*a*, 109*b* supporting the contacting member 107. A spring arm 109*c* is formed by contacting the sacrificing layer 106. Auxiliary supporting portions 109*d*, 109*e* are additionally formed along the orthogonal direction of the lengthwise direction of the contact member 107.

The supporting portion 109 may be formed of insulating materials such as SiNx, $SiO_2$ and polymer. The deposition of the SiNx may be achieved by PE-CVD, and a polymer deposition may be achieved by spin coating.

Figure 10E:
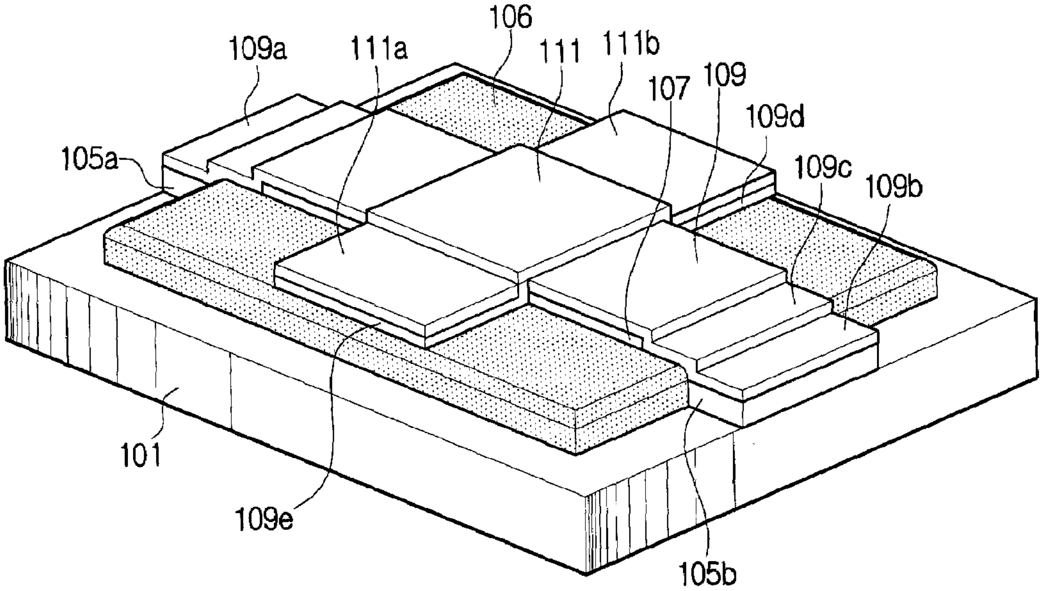

Referring to FIG. 10E, the moving electrode 111 is formed corresponding to the fixed electrode 103. The moving electrode 111 may be formed of conductive materials, just like the fixed electrode 103. The moving electrode 111 may be formed as wide as the width of the contact member 107, but may be additional formed with auxiliary electrode portions 111*a*, 111*b* deposed on upper sides of the auxiliary supporting portions 109*d*, 109*e*, to decrease driving voltage.

Figure 10F:
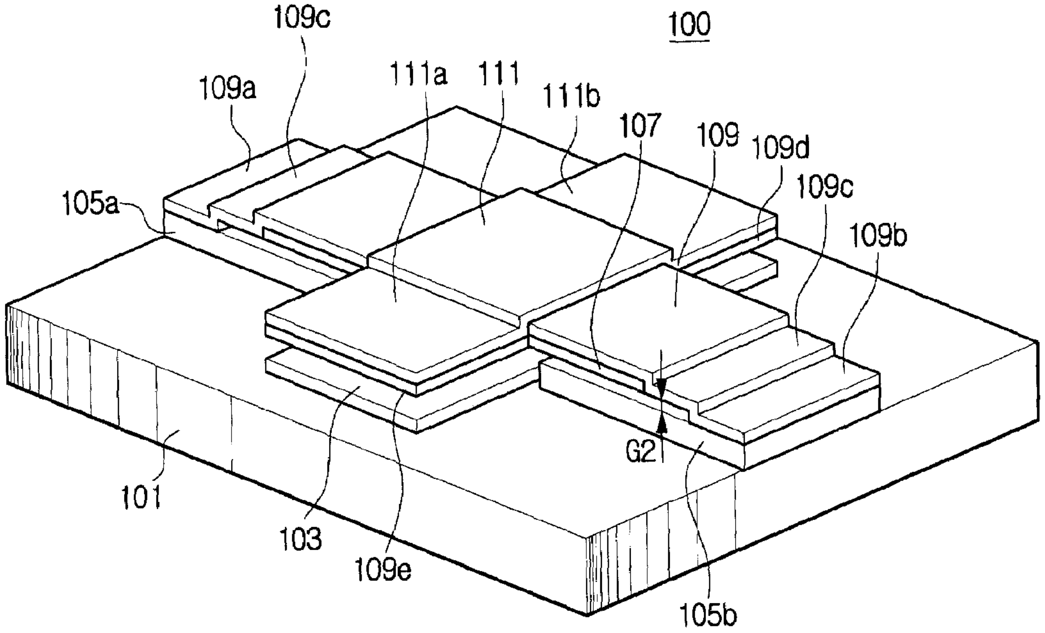

Referring to FIG. 10F, the sacrificing portion 106 is removed to form the contact member 107 apart from the upper sides of the signal lines 105*a*, 105*b* at a gap (G2) and the MEMS switch 100. The sacrificing layer 106 is removed by an ashing process.

Based on the above structure, the MEMS switch of the present invention may be driven at low voltage.

Contact pressure may increase as the contact member contacts the edging portion of the signal line.

As the place where the contact member contacts the edging portions nears not the central part of the moving electrode but the anchoring portion, piecewise stiffness increases and the restoring force strengthens. Accordingly, as a moment arm becomes less than the conventional invention of which sticking force is exerted from a center of the moving electrode, a sticking moment decreases, to have declining sticking failure.

While the invention has been shwon and described with reference to certain exemplary embodiments thereof, it will be understood by those skilled in the art that various changes in form and details may be made therein without departing from the spirit and scope of the invention as defined by the appended claims.

What is claimed is:

1. A micro-electro mechanical system (MEMS) switch comprising:

a substrate;

a fixed electrode formed on an upper side of the substrate;

a plurality of signal lines formed on both sides of the fixed electrode;

a conductive contact member formed on an upper side of the signal line at a distance in parallel with the signal lines;

a supporting member, of which both sides are anchored on the signal lines, supporting the contact member to be movable; and a moving electrode disposed on an upper side of the supporting member.

2. The MEMS switch of claim 1, wherein both ends of the contact member overlap with ends of the signal lines.

3. The MEMS switch of claim 1, wherein an upper side of the signal lines are formed in a higher position than an upper side of the fixed electrode.

4. The MEMS switch of claim 2, wherein the supporting member comprises spring arms.

5. The MEMS switch of claim 4, wherein the supporting member is insulated and anchored on the signal lines.

6. The MEMS switch of claim 5, wherein the insulating materials are formed of one of SiNx (silicon nitride film), SiO2 (silicon oxide film) and polymer.

7. The MEMS switch of claim 1, wherein the moving electrode is connected to an auxiliary electrode in an orthogonal direction of a lengthwise direction of the contacting member.

8. The MEMS switch of claim 7, wherein the supporting member is connected to an auxiliary supporting portion supporting the auxiliary electrode.

9. The MEMS switch of claim 1, wherein the fixed electrode is formed of aluminum (Al) or gold (Au).

10. The MEMS switch of claim 1, wherein the signal lines are formed of Au.

11. The MEMS switch of claim 1, wherein the moving electrode is formed of Al or Au.

12. The MEMS switch of claim 3, wherein the signal lines are deposed thicker than the fixed electrode.

13. The MEMS switch of claim 4, wherein the spring arms are formed into steps by bending both sides of the supporting member.

14. The MEMS switch of claim 5, wherein the supporting member is integrally formed of insulating materials.

15. The MEMS switch of claim 7, wherein the fixed electrode further comprises an auxiliary electrode corresponding to the auxiliary electrode of the moving electrode.

16. The MEMS switch of claim 1, wherein the contact member is a plate-shaped conductive material.

17. The MEMS switch of claim 3, wherein a center part of the supporting member is a plate-shaped insulating material which corresponds to the contact member.

18. A micro-electro mechanical system (MEMS) switch comprising:

a substrate;

a fixed electrode formed on an upper side of the substrate;

a plurality of signal lines formed on both sides of the fixed electrode;

a plate-shaped conductive contact member formed on an upper side of the signal line at a distance;

a bridge type supporting member, of which a plate-shaped center part to which the contact member is attached at a lower end, and both side parts in which a spring arm is formed are integrally formed; and a moving electrode disposed on an upper side of the supporting member.

19. The MEMS switch of claim 18, wherein the contact member is disposed in parallel with the signal lines.

20. The MEMS switch of claim 18, wherein both sides of the supporting member are insulated and anchored on the signal lines.

21. The MEMS switch of claim 18, wherein an upper side of the signal line is formed in a higher position than an upper side of the fixed electrode.

22. The MEMS switch of claim 18, wherein the spring arms are formed into steps by bending both sides of the supporting member.

23. The MEMS switch of claim 18, wherein the moving electrode further comprises an auxiliary electrode in an orthogonal direction of a lengthwise direction of the contacting member.

24. The MEMS switch of claim 23, wherein the fixed electrode further comprises an auxiliary electrode corresponding to the auxiliary electrode of the moving electrode.

25. The MEMS switch of claim 23, wherein the supporting member further comprises an auxiliary supporting portion supporting the auxiliary electrode.

* * * * *